United States Patent
Ward et al.

(10) Patent No.: US 9,309,980 B2
(45) Date of Patent: Apr. 12, 2016

(54) BIKE TIRE PUMP CHUCK

(71) Applicants: Gregory Alan Ward, Pasadena, CA (US); Wen C. Hsieh, Rancho Dominguez, CA (US)

(72) Inventors: Gregory Alan Ward, Pasadena, CA (US); Wen C. Hsieh, Rancho Dominguez, CA (US)

( * ) Notice: Subject to any disclaimer, the term of this patent is extended or adjusted under 35 U.S.C. 154(b) by 79 days.

(21) Appl. No.: 14/197,147

(22) Filed: Mar. 4, 2014

(65) Prior Publication Data

US 2015/0252910 A1  Sep. 10, 2015

(51) Int. Cl.
*F16K 15/20* (2006.01)
*F16L 15/04* (2006.01)
*F16L 17/00* (2006.01)
*B60S 5/04* (2006.01)

(52) U.S. Cl.
CPC ............... *F16K 15/20* (2013.01); *F16L 15/04* (2013.01); *F16L 17/00* (2013.01); *B60S 5/04* (2013.01); *Y10T 137/3584* (2015.04); *Y10T 137/3724* (2015.04)

(58) Field of Classification Search
CPC ...... B60C 29/06; B60S 5/04; Y10T 137/3584
See application file for complete search history.

(56) References Cited

U.S. PATENT DOCUMENTS

| 2003/0221724 A1* | 12/2003 | Wang | B60S 5/04 137/223 |
| 2005/0129544 A1* | 6/2005 | Wu | F04B 33/005 417/440 |
| 2005/0263185 A1* | 12/2005 | Chen | F16K 15/20 137/231 |
| 2013/0105001 A1* | 5/2013 | Huang | B60C 29/06 137/315.01 |

* cited by examiner

*Primary Examiner* — R. K. Arundale
(74) *Attorney, Agent, or Firm* — Charles C. H. Wu; Charles C. H. Wu & Associates, APC (57) ABSTRACT

A pump chuck for connection with a valve stem of a tire valve is disclosed. The pump chuck comprises a body having a first bore, a second bore, a third bore and a passageway connecting the first bore and the third bore therethrough, a pivot clip pivotally mounted on the body and having a plurality of threads on one end and a depression on a bottom surface, a spring compressed between the pivot clip and the body, a rubber seal housed inside the first bore of the body, an end cap mounted on the top surface of the body above the first bore, and a connector housed inside the third bore of the body to connect a hose from a tire pump. The contact of the rubber seal against the valve stem affects an air tight seal.

22 Claims, 7 Drawing Sheets

BIKE TIRE PUMP CHUCK

BACKGROUND OF THE DISCLOSURE

1. Technical Field of the Disclosure

The present embodiment is related in general to chucks for use in connection with pumps for inflating bicycle tires or other inflatable objects, and in particular to a pump chuck that easily connects to a valve stem of a tire valve to produce an air tight seal.

2. Description of the Related Art

It is well known that for inflating the tires of vehicles, particularly two-wheel vehicles such as bicycles, motorcycles, or motor-assisted cycles, a flexible connector is generally used having one end coupled and sealed to a source of air under pressure such as a bicycle pump or hand air pump, the other end is sealed onto the valve stem of the tire valve. Tire inflation devices typically have a chuck for attaching to and substantially sealing at the valve stem of the tire valve (or other inflatable article). In order to properly inflate the article, the chuck must seal at the valve and limit or preclude leakage of air at the chuck-valve connection. Often, such a seal is not readily made with conventional chucks and leakage occurs, often leading to improperly inflated tires or articles.

Conventional chucks on bicycle tire pumps are difficult to use as they use a cam and lever to compress a rubber seal against the valve stem. The rubber seal must prevent air leaks at pressures up to 125 PSI as well as retain the chuck on the stem at pressures up to 125 PSI. This requires a significant lever force to compress the rubber seal making it hard to attach the chuck to the valve stem. Further, it is difficult to insert the chuck on to the valve stem due to tight seal clearance and it is difficult to actuate the cam lever due to the large force required to compress the seal on to the valve stem. Moreover, it is also difficult to hold the stem tightly to insert the chuck on to the valve stem when tire is flat or has little air.

Recent advancements in the art disclose a chuck for connecting a pressure device to a valve stem of a pressurized vessel including a body portion having a first passageway that is configured to receive an outer tube portion of a valve stem of a pressurized vessel therein. The body portion has a guide portion at an inner end of the first passageway. A pin element is movably disposed within a second passageway of the body portion and is movable along the coaxial passageways. The guide portion includes an alignment element at least partially around the second passageway and extending longitudinally toward an engaging end of the body portion and at least partially around the pin element for engaging and supporting an interior portion of the end of the outer tube portion of the valve stem. However, external pressure has to be applied to form an air tight seal.

One of the existing pump chucks comprises a main body defining a chamber and having a top end and a bottom end; a force transmitting member positioned in the chamber adjacent to the top end of the main body; a resilient collar positioned in the chamber adjacent to the bottom end of the main body and in engagement with the force transmitting member; and a camming device mounted at the top end of the main body. The collar defines an axial cavity having an inner wall and an inside diameter. Compression of the collar decreases the inner diameter of the collar, and thus causes the collar to engage and seal the valve stem positioned in the axial cavity. However, the user will have to exert significant force to compress the collar to engage and seal the valve stem.

Another existing device discloses an air chuck that provides a manual press-fitted connection to the valve stem of an automobile tire or the like, consisting of a tubular body member attachable to the hose end and having a pressure-seated plunger valve therein. The plunger valve has a plunger extension which, when pressed over the valve stem of an automobile tire, opens both the plunger valve and the air valve of the stem to admit air to the stem. The invention is characterized by the construction of the body member, hose and plunger valve assembly, wherein a single assembly member performs the functions of providing a sealed connection of the hose to the body member, limiting and controlling the motion of the plunger valve, and providing for air passage from the hose to the plunger valve. However, the connection has to be made manually by pressing the plunger.

Various other pump chucks exist that are used in tire inflating devices. One such device includes an air chuck for tire valves having a plurality of teeth which positively lock the chuck to the valve stem by a plurality of closely spaced, radially inwardly projecting fingers which are moved into engagement with the valve stem by sliding a sleeve member over the fingers. The chuck includes a means for depressing the tire valve pin and a means for sealing the outer end of the valve when the chuck is engaged. Another device includes a quick-coupling connector that comprises a tubular body with a piston actuator which may be formed in one or two parts between an operating lever and a sealing ring which in response to the displacement is compressed and tightly squeezed against the inflation valve conforming to its threaded outer surface and forming an air-tight connection. However, such devices require significant lever force to compress the rubber around the valve stem.

Based on the foregoing there is a demonstrable need for a pump chuck that easily attaches to the valve stem of a tire valve. Such a needed pump chuck would comprise a pivot clip that easily secures the valve stem in the pump chuck. Further, the pump chuck would be easy to hold over the valve stem when the tire is flat. Finally, the fastening device would be economical and reliable to use. The present invention overcomes prior art shortcomings by accomplishing these critical objectives.

SUMMARY OF THE INVENTION

To minimize the limitations found in the prior art, and to minimize other limitations that will be apparent upon the reading of the specifications, the preferred embodiment of the present invention provides a pump chuck that uses a pivot clip with matching threads to easily attach to the valve stem of a tire valve.

The pump chuck forms an air tight seal when the stem is inserted into the chuck and pushed against a rubber seal.

The preferred embodiment of the pump chuck comprises a body, at least one pivot clip, end cap, a rubber seal, a pin, and a spring. In the preferred embodiment, a compression spring is used however a torsion spring may also be used. The body has at least one valve stem hole having an internal bore comprising a first bore to receive the rubber seal, and a second bore to receive a compression spring. The body has a third bore to receive the connector for the hose from the tire pump. The pivot clip is pivotally mounted on the body by means of a pivot screw. The pivot clip compresses the compression spring against the body. The pump chuck further comprises an end cap mounted on the body above the first bore that houses the rubber seal. The end cap has a smooth bore just slightly bigger than the valve stem diameter. The pivot clip has a plurality of threads that match the threads on the valve stem to secure the stem to the chuck. The bottom side of the end cap retains the rubber seal in the first bore.

For the purpose of attaching the pump chuck to the valve stem, the pivot clip is pushed down and the valve stem is inserted into the valve stem hole or first bore in the end cap. The pivot clip must move far enough so the threads in the pivot clip clear the valve stem. The pivot clip is then released causing the compression spring to push the pivot clip against the valve stem thereby holding the valve stem tightly between the pivot clip and the end cap. The pivot point of the pivot clip is located close to the outside diameter of the valve stem to hold the valve stem in place as the air pressure is increased by the pump.

The present invention easily slips over the valve stem and the pivot clip opens like a clothes pin to secure the pump chuck to valve stem. It is easy to hold the valve stem when inserting the pump chuck when the tire is flat because the pump chuck easily attaches to the valve stem. Further, the pump chuck may be used with two types of valve stems—Schrader valve and Presta valve.

A pin is provided with the invention for use with a Schrader Valve.

The first objective of the present invention is to provide a pump chuck that easily attaches to the valve stem.

A second objective of the present invention is to provide a pump chuck that is compatible with Schrader and Presta valves.

A third objective of the present invention is to provide a pump chuck that is economical and reliable.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1:
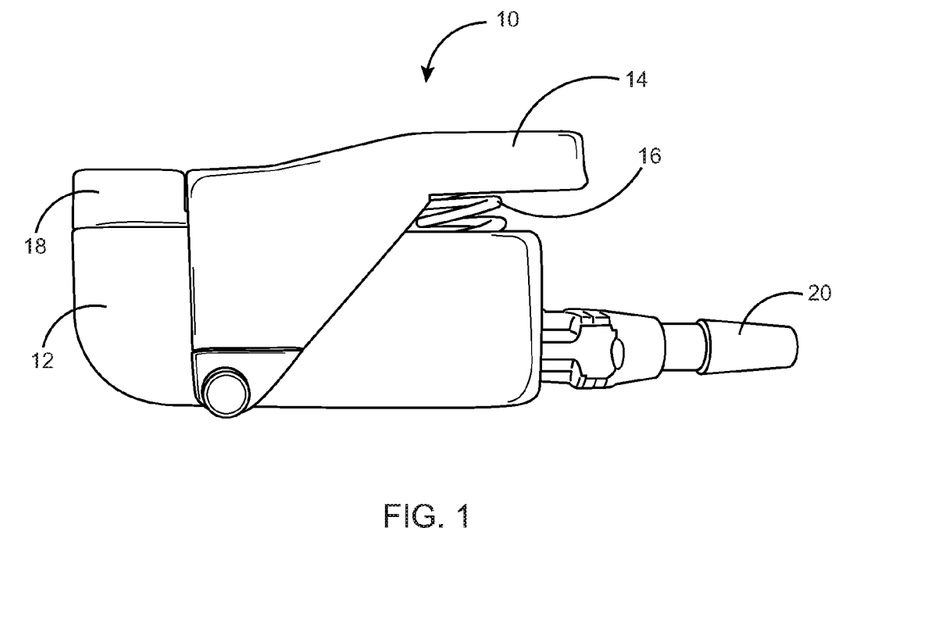
FIG. 1 is a side perspective view of a preferred embodiment of a pump chuck.
Figure 2:
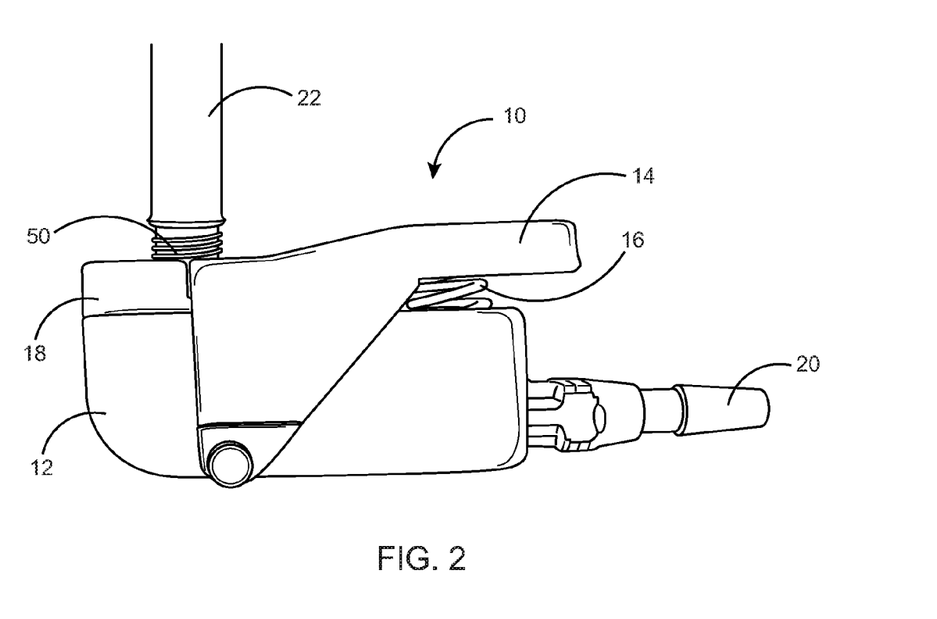
FIG. 2 is a side perspective view of the preferred embodiment of the pump chuck connected to a Schrader valve stem.

FIGS. 1-2 illustrate side perspective views of a preferred embodiment of a pump chuck 10. The pump chuck 10 comprises a body 12, at least one pivot clip 14 pivotally mounted on the body 12, a compression spring 16 compressed between the pivot clip 14 and the body 12, an end cap 18 mounted on the body 12, and a connector 20 mounted on the body 12 to connect a hose 28 (See FIG. 3) from a tire pump (not shown).

Figure 3:
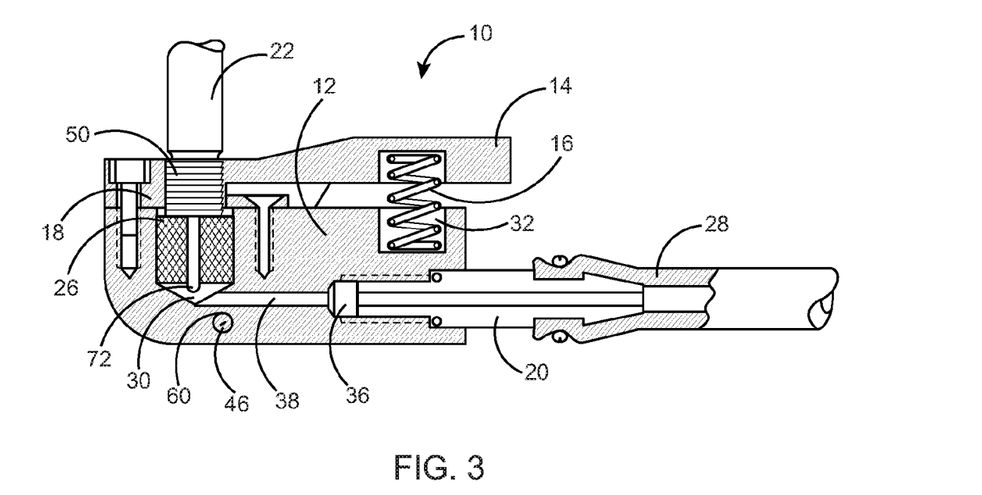
FIG. 3 is a sectional view of the preferred embodiment of the pump chuck connected to the Schrader valve stem.

FIG. 3 is a sectional view of the preferred embodiment of the pump chuck 10 connected to the valve stem 22. The pump chuck 10 further comprises a seal 26 housed inside the body 12 and a pin 72 housed inside the body 12. The hose 28 from the tire pump (not shown) is clamped to the connector 20.

Figure 4:
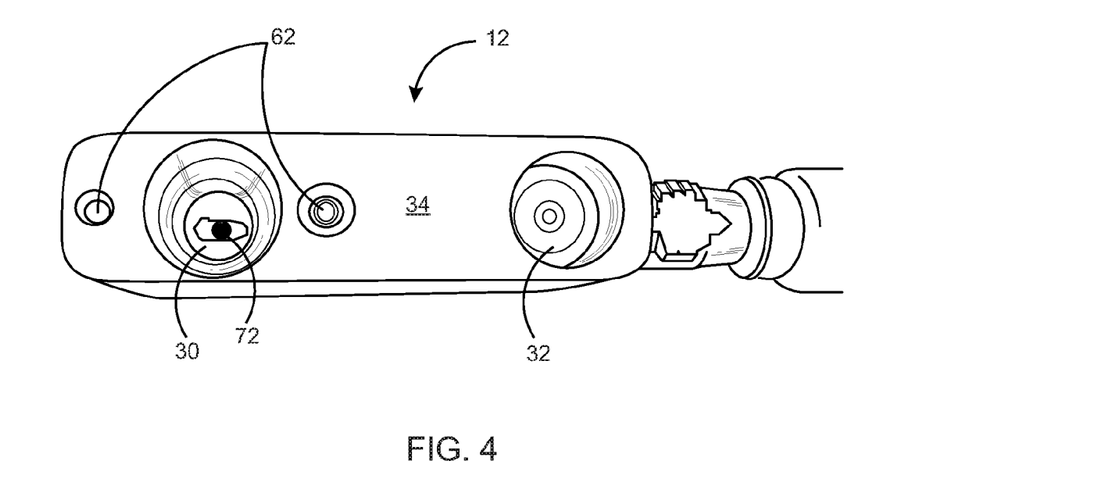
FIG. 4 is a top perspective view of a body of the pump chuck.

FIG. 4 is a top perspective view of the body 12 of the pump chuck 10. Referring to FIGS. 3-4, the body 12 has at least one valve stem hole 30 having an internal bore 30 for connecting a valve stem 22, the internal bore 30 comprising a first bore 30 of the body 12, a second bore 32 on a top surface 34 of the body 12, a third bore 36 on a side surface of the body 12, and a passageway 38 connecting the first bore 30 and the third bore 36 therethrough. The seal 26 is housed inside the first bore 30 of the body 12. The pin 72 is housed inside the first bore 30 of the body 12. The connector 20 is housed inside the third bore 36 of the body 12 to connect a hose 28 from a tire pump (not shown).

Figure 5:
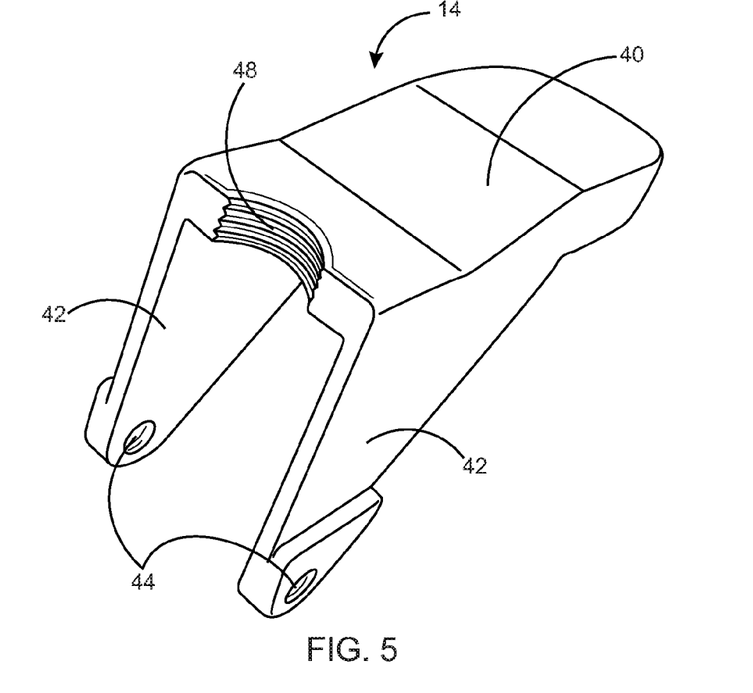
FIG. 5 is a perspective view of a pivot clip of the pump chuck.

FIG. 5 is a perspective view of the pivot clip 14 of the pump chuck 10. The pivot clip 14 has an elongated portion 40 and a pair of wings 42 extending perpendicularly from the sides of the elongated portion 40. Each of the pair of wings 42 has a hole 44 on one end to insert a pivot screw 46 (See FIG. 3) for mounting on the body 12. The pivot clip 14 has a plurality of threads 48 on one end of the elongated portion 40 for engaging with a plurality of matching threads 50 (See FIG. 2) on the valve stem 22. The pivot clip 14 also has a depression 52 (See FIG. 7) on a bottom surface to hold the compression spring 16 in place.

Figure 6:
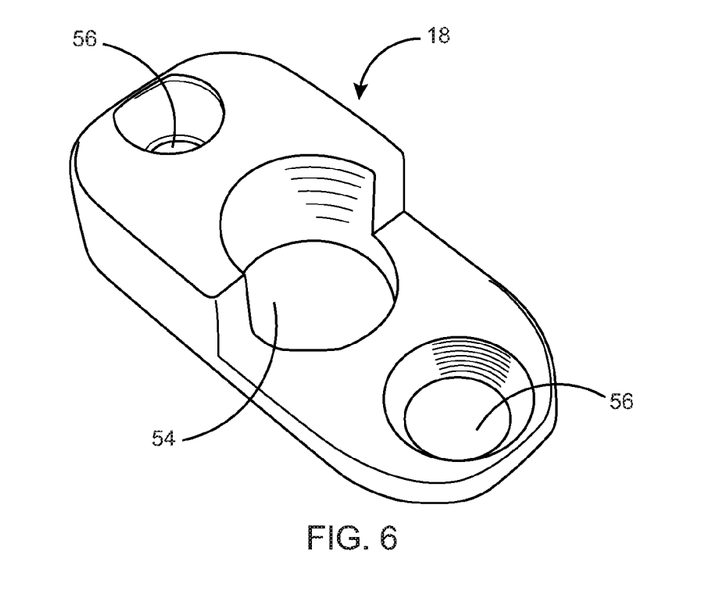
FIG. 6 is a perspective view of an end cap of the pump chuck.

FIG. 6 is a perspective view of the end cap 18 of the pump chuck 10. The end cap 18 has a smooth bore 54 therethrough to receive the valve stem 22. The end cap 18 also has a pair of holes 56 on either side of the bore 54 for inserting a pair of screws 58 (See FIG. 7) for mounting on the body 12. The diameter of the bore 54 is slightly bigger than the diameter of the valve stem 22. The end cap 18 retains the seal 26 in the first bore 30 of the body 12.

Figure 7:
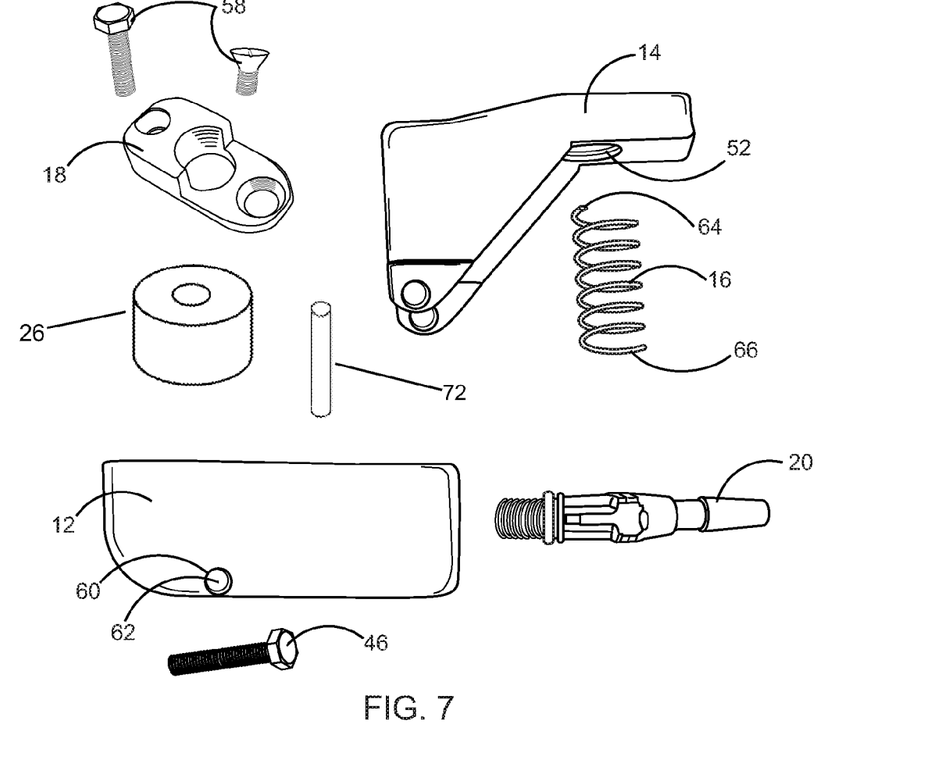
FIG. 7 is an exploded view of the preferred embodiment of the pump chuck.

FIG. 7 is an exploded view of the preferred embodiment of the pump chuck 10. The pivot clip 14 is mounted on the body 12 by means of a pivot screw 46 which is inserted into the body 12 at a pivot point 60 located on the body 12 adjacent the outside diameter of the valve stem 22. The pivot screw 46 is inserted through at least one of a plurality of holes 62 in the body 12. The compression spring 16 is compressed between the pivot clip 14 and the body 12 when the pivot clip 14 is mounted on the body 12. A first end 64 of the compression spring 16 rests in a depression 52 on a bottom surface of the pivot clip 14 and a second end 66 of the compression spring 16 rests in the second bore 32 of the body 12. The end cap 18 is mounted on the top surface 34 of the body 12 by means of a pair of screws 58 which is inserted through at least one of the plurality of holes 62 in the body 12. The end cap 18 is mounted in such a way that the bore 54 of the end cap 18 is aligned with the first bore 30 of the body 12.

Figure 8:
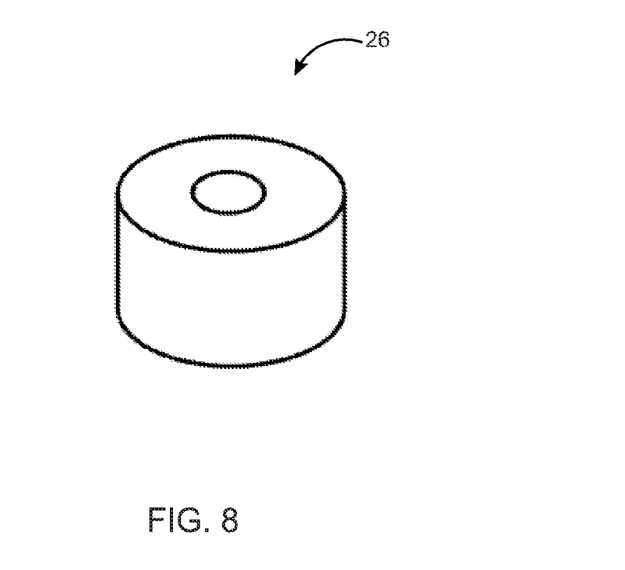
FIG. 8 is a perspective view of a rubber seal of the pump chuck.

FIG. 8 is a perspective view of the rubber seal 26 of the pump chuck 10. The washer 26 is a rubber seal that forms an air tight seal when it is pushed against the valve stem 22.

For attaching the pump chuck 10 to the valve stem 22, the pivot clip 14 is pushed down and the valve stem 22 is inserted into the bore 54 in the end cap 18 and pushed against seal 26. The pivot clip 14 must be moved far enough so that the plurality of threads 48 in the pivot clip 14 clear the valve stem 22. The pivot clip 14 is then released causing the compression spring 16 to push the pivot clip 14 against the valve stem 22 thereby holding the valve stem 22 tightly between the pivot clip 14 and the end cap 18. The pivot point 60 is located close to the outside diameter of the valve stem 22 (See FIG. 3) to hold the valve stem 22 in place as the tire pressure increases.

The pump chuck 10 is compatible with two types of valve stems—Schrader valve stems 22 and Presta valve stems 23. The various components of the pump chuck 10 change slightly in dimensions for the two types of valve stems 22, 23. The pivot clip 14 has M8 X 0.75P threads for Schrader valve (not shown) and M6 X 0.75P threads for Presta valve (not shown). The end cap 18 has a bore 54 with 7.8 mm diameter for Schrader valve and a bore 54 with 6.1 mm diameter for Presta valve. The distance between the central axis of the valve stem 22, 23 and the pivot point 60 (See FIG. 3) is 0.150 inches for Schrader valve and 0.115 inches for Presta valve. The seal 26 has an inside diameter of approximately 0.188 inch for both the Schrader valve and the Presta valve.

Figure 9A:
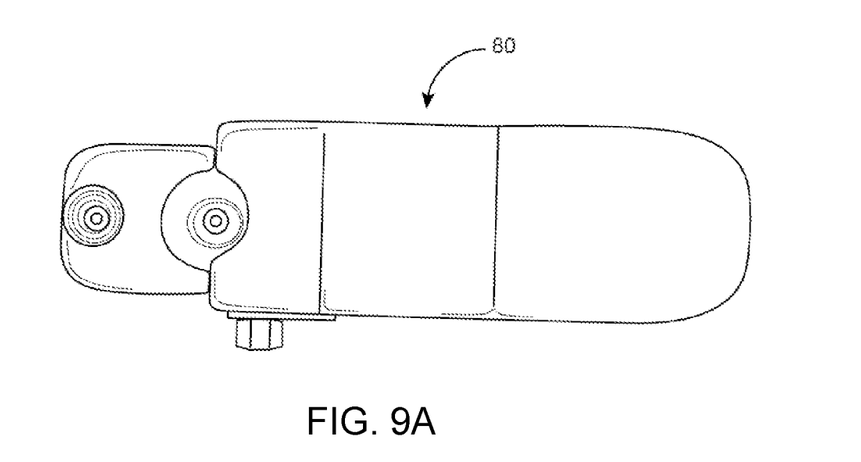
FIGS. 9A-9E illustrate perspective views of the pump chuck in various configurations.
Figure 9B:
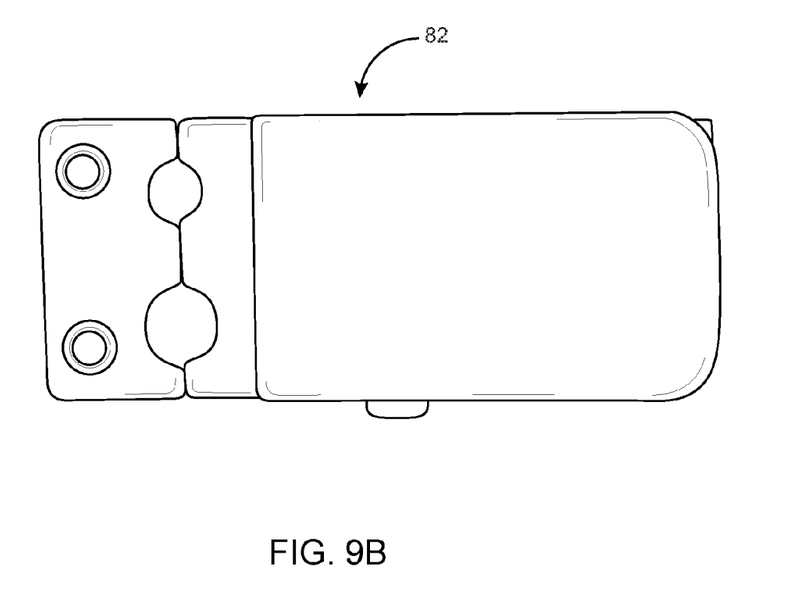
Figure 9C:
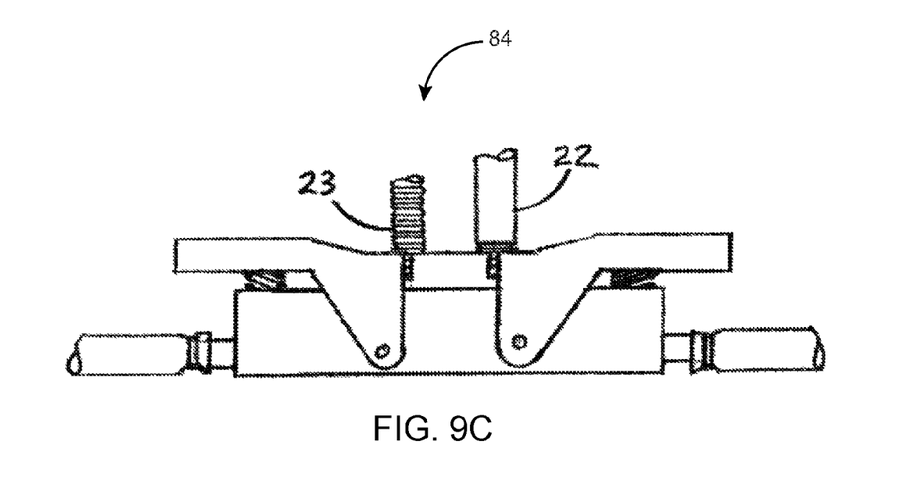
Figure 9D:
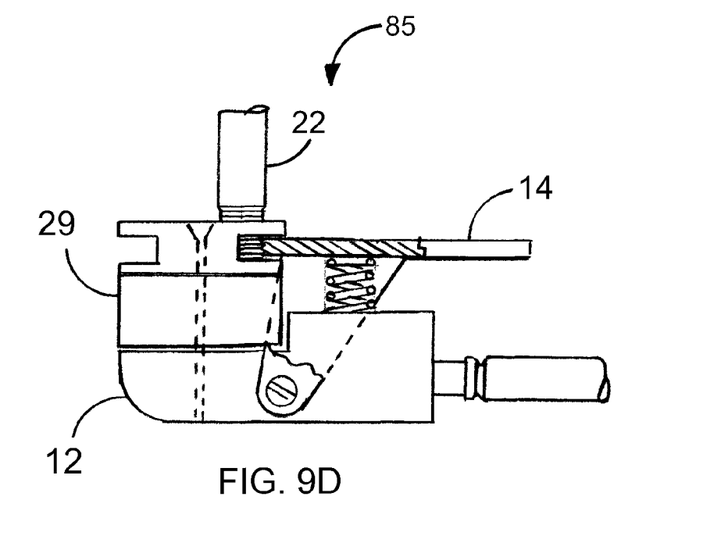
Figure 9E:
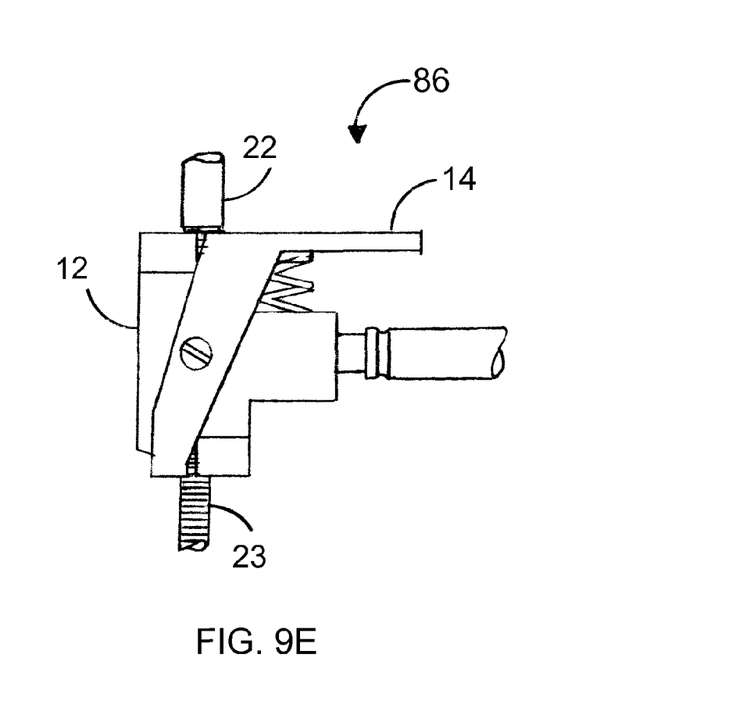

FIGS. 9A-9E illustrate various configurations of the pump chuck 10 of the present invention. The pump chuck 10 may be a single unit compatible with either Schrader (not shown) or Presta (not shown) valves or the pump chuck 10 may be a double unit compatible with both Schrader (not shown) and Presta (not shown) valves. FIG. 9A is a top perspective view of a pump chuck 80 which is a single unit compatible with either Schrader (not shown) and Presta (not shown) valves. FIG. 9B is a top perspective view of a pump chuck 82 which is a double unit with side-by-side configuration, compatible with both Schrader (not shown) and Presta (not shown) valves. In side-by-side configuration, both Schrader (not shown) and Presta (not shown) valves are attached on the same side of the pump chuck 82. FIG. 9C is a perspective side view of a pump chuck 84 which is a double unit with in-line configuration, compatible with both Schrader (not shown) and Presta (not shown) type valve stems. In in-line configuration, both Schrader and Presta valves are attached on opposite sides of the pump chuck 84. FIG. 9D is a front perspective side view of a pump chuck 85 that is a double unit with in-line configuration that is compatible with both the Schrader (not shown) and Presta (not shown) valves. The upper body 29 has two valve stem holes 30, 31 and rotates 180 degrees to engage the pivot clip. FIG. 9E is a front perspective view of a pump chuck 86 that is a double unit with in-line configuration that is compatible with both the Schrader (not shown) and Presta (not shown) valves. The valve stem hole 30 for the Schrader valve (not shown) and the valve stem hole 31 for the Presta valve (not shown) are on opposite sides of the body 12 with a single pivot clip 14 that engages either valve stem 22, 23.

The presently disclosed pump chuck 10 is advantageous because it easily slips over the valve stem 22 of a Schrader (not shown) or Presta (not shown) valve and the pivot clip 14 opens like a clothes pin to secure the pump chuck 10 to the valve stem 22. Further, it is easy to hold the valve stem 22 when inserting the pump chuck 10 when the tire is flat because the pump chuck 10 may be easily engaged with the valve stem 22. Further, the pump chuck 10 is compatible to use with both Schrader (not shown) and Presta (not shown) valves.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. A pump chuck for connection with a valve stem of a tire valve, the pump chuck comprising:
   a body having
      at least one valve stem hole having an internal bore comprising a first bore on a surface of the body;
      a second bore on a top surface of the body;
      a third bore on a side surface of the body; and
      a passageway connecting the first bore and the third bore therethrough;
   at least one pivot clip pivotally mounted on the surface of the body on which the corresponding first bore is disposed, the pivot clip having a plurality of threads for engaging with a plurality of matching threads on the valve stem and a depression on a bottom surface of the pivot clip;
   a spring compressed between the pivot clip and the body, wherein a first end of the spring rests in the depression of the pivot clip and a second end of the spring rests in the second bore of the body;
   a rubber seal having a bore therethrough, and housed inside the first bore of the body;
   an end cap mounted on the surface of the body above the first bore, the end cap having a bore therethrough, aligned with the first bore, to receive the valve stem; and
   a connector housed inside the third bore of the body to connect a hose from a tire pump;
   whereby, the contact of the rubber seal against the valve stem affects an air tight seal;
   whereby, the end cap aligns the valve stem, centering it in the first bore of the body; and
   whereby, the end cap supports the valve stem squarely with the body of the pump chuck and prevents the valve stem from moving when the pivot clip pushes against the valve stem.

2. The pump chuck of claim 1 wherein the pivot clip is mounted on the body at a pivot point located thereon adjacent an outside diameter of the valve stem.

3. The pump chuck of claim 1 wherein the plurality of threads on the pivot clip engages with the plurality of matching threads on the valve stem thereby securing the valve stem to the pump chuck.

4. The pump chuck of claim 1 wherein the valve stem is inserted into the chuck and pushed against the rubber seal thus forming an air tight seal.

5. The pump chuck of claim 1 wherein the end cap retains the rubber seal in the first bore of the body.

6. The pump chuck of claim 1 wherein the spring pushes the pivot clip against the valve stem thereby holding the valve stem inside the bore of the end cap.

7. The pump chuck of claim 1 wherein the valve stem hole is adapted to receive the valve stem of a Schrader valve and Presta valve.

8. A pump chuck for connection with a valve stem of a tire valve, the pump chuck comprising:

a body having
  at least one valve stem hole having an internal bore comprising a first bore on a surface of the body,
  a second bore on a top surface of the body;
  a third bore on a side surface of the body; and
  a passageway connecting the first bore and the third bore therethrough;
at least one pivot clip pivotally mounted on the surface of the body on which the corresponding first bore is disposed, the pivot clip having a plurality of threads for engaging with a plurality of matching threads on the valve stem and a depression on a bottom surface of the pivot clip
a spring compressed between the pivot clip and the body, wherein a first end of the spring rests in the depression of the pivot clip and a second end of the spring rests in the second bore of the body;
a rubber seal having a bore therethrough, and housed inside the first bore of the body;
a removable pin housed inside the bore of the rubber seal and the first bore of the body;
an end cap mounted on the surface of the body above the first bore, the end cap having a bore therethrough, aligned with the first bore, to receive the valve stem; and
a connector housed inside the third bore of the body to connect a hose from a tire pump,
whereby, the contact of the rubber seal against the valve stem affect affects an air tight seal;
whereby, the end cap aligns the valve stem, centering it in the first bore of the body; and
whereby, the end cap supports the valve stem squarely with the body of the pump chuck and prevents the valve stem from moving when the pivot clip pushes against the valve stem.

9. The pump chuck of claim 8 wherein the pivot clip is mounted on the body at a pivot point located thereon adjacent an outside diameter of the valve stem.

10. The pump chuck of claim 8 wherein the plurality of threads on the pivot clip engages with the plurality of matching threads on the valve stem thereby securing the valve stem to the pump chuck.

11. The pump chuck of claim 8 wherein the valve stem is inserted into the chuck and pushed against the rubber seal thus forming an air tight seal.

12. The pump chuck of claim 8 wherein the end cap retains the rubber seal in the first bore of the body.

13. The pump chuck of claim 8 wherein the spring pushes the pivot clip against the valve stem thereby holding the valve stem inside the bore of the end cap.

14. The pump chuck of claim 8 connected to the valve stem of a Schrader valve, wherein the pin pushes the valve stem inward to an open position.

15. The pump chuck of claim 8, wherein the pin is removed for connection to a Presta valve.

16. A pump chuck for connection with a plurality of tire valve stems, the pump chuck comprising:
a body having
  at least two valve stem holes, each having an internal bore, positioned on a top or bottom surface of the body;
  a bore on a top surface of the body;
  a bore on a side surface of the body; and
  a passageway connecting the internal bores of the valve stem holes and the bore on the side surface of the body therethrough;
at least one pivot clip corresponding to each one of the at least two valve stem holes, each pivot clip pivotally mounted on the same surface as the corresponding valve stem hole, each pivot clip having a plurality of threads for engaging with a plurality of matching threads on a corresponding valve stem and a depression on a bottom surface of said pivot clip;
at least one spring corresponding to each one of the at least one pivot clips, each of said springs being compressed between the corresponding pivot clip and the body, wherein a first end of said spring rests in the depression of said pivot clip and a second end of said spring rests in the second bore of the body;
at least one rubber seal corresponding to each one of the at least two valve stem holes, each rubber seal having a bore therethrough, and each rubber seal housed inside the corresponding valve stem hole;
at least one end cap corresponding to each one of the at least two valve stem holes, each end cap mounted above each of the corresponding valve stem holes, each end cap having a bore therethrough, aligned with the internal bore of the corresponding valve stem hole, to receive the corresponding valve stem; and
at least one connector housed inside the bore on a side surface of the body to connect a hose from a tire pump;
whereby, the contact of the rubber seals against the valve stems affect an air tight seal;
whereby, the valve stems are secured to the pump chuck when the threads of the pivot clips engage with the threads on the valve stems;
whereby, the end cap aligns and secures the rubber seals and the valve stems within the corresponding valve stem holes, preventing movement when the pivot clip is pushed against the corresponding valve stem; and
whereby, the spring pushes the pivot clip against the valve stem thereby holding the corresponding valve stem inside the bore of the end cap.

17. The pump chuck of claim 16 wherein a first valve stem hole of the at least two valve stem holes for receiving a first Schrader or Presta valve and a second valve stem hole of the at least two valve stem holes for receiving a second Schrader or Presta valve are located side by side on the top or bottom surface of the body of the pump chuck.

18. The pump chuck of claim 17 having side by side valve stem holes, wherein a single pivot clip is pivotally mounted on the top surface of the body of the pump chuck.

19. The pump chuck of claim 16 wherein a first valve stem hole of the at least two valve stem holes for receiving a first Schrader or Presta valve and a second valve stem hole of the at least two valve stem holes for receiving a second Schrader or Presta valve are disposed on opposing surfaces of the body of the pump chuck.

20. The pump chuck of claim 19 wherein the valve stem holes have an in-line configuration.

21. The pump chuck of claim 16 having two pivot clips, one for each valve stem hole.

22. The pump chuck of claim 19 having one pivot clip, wherein the body rotates 180 degrees to allow the pivot clip to engage with the corresponding valve stem.

* * * * *